(12) United States Patent
Singh et al.

(10) Patent No.: US 11,780,273 B2
(45) Date of Patent: Oct. 10, 2023

(54) METHOD FOR EXTRACTING CHANGES IN TIRE CHARACTERISTICS

(71) Applicant: The Goodyear Tire & Rubber Company, Akron, OH (US)

(72) Inventors: Kanwar Bharat Singh, Lorenztweiler (LU); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 721 days.

(21) Appl. No.: 16/998,312

(22) Filed: Aug. 20, 2020

(65) Prior Publication Data

US 2021/0061021 A1    Mar. 4, 2021

Related U.S. Application Data

(60) Provisional application No. 62/893,862, filed on Aug. 30, 2019.

(51) Int. Cl.
*B60C 11/24* (2006.01)
*B60C 19/00* (2006.01)
(Continued)

(52) U.S. Cl.
CPC .......... *B60C 11/246* (2013.01); *B60C 11/243* (2013.01); *B60C 19/00* (2013.01);
(Continued)

(58) Field of Classification Search
CPC ................................ B60C 11/24; G06N 20/10
See application file for complete search history.

(56) References Cited

U.S. PATENT DOCUMENTS

| 5,864,056 A | 1/1999 | Bell et al. |
| 6,083,268 A | 7/2000 | Kelsey et al. |

(Continued)

FOREIGN PATENT DOCUMENTS

| EP | 2679411 A2 | 1/2014 |
| WO | 2019186353 A1 | 10/2019 |

(Continued)

OTHER PUBLICATIONS

Liu Zengli, Research on Vehicle Tire Pressure Monitoring System Based on Bluetooth Beacon, Master's Dissertation of Chongqing University of Technology, Nov. 15, 2018, Chongqing, CN.

(Continued)

*Primary Examiner* — Tan Q Nguyen
(74) *Attorney, Agent, or Firm* — Edward T. Kennedy

(57) ABSTRACT

A method for extracting changes in characteristics of a tire supporting a vehicle is provided. The method includes extracting selected tire characteristics from at least one sensor mounted on the tire. The selected tire characteristics are transmitted to a remote processor and are stored in a historical data log that is in communication with the remote processor. At least one tire characteristic of interest is selected, and a time series decomposition model is applied to data from the historical data log to delineate exogenous inputs from an underlying trend in the selected tire characteristic of interest. A learning model is applied to the underlying trend in the selected tire characteristic of interest to model a relationship between the selected tire characteristic of interest and a condition of the tire. A prediction value for a condition of the tire is output from the learning model.

10 Claims, 6 Drawing Sheets

(51) Int. Cl.
*B60C 23/04* (2006.01)
*H04L 12/40* (2006.01)
*G06N 20/10* (2019.01)

(52) U.S. Cl.
CPC .......... *B60C 23/0408* (2013.01); *H04L 12/40* (2013.01); *B60C 2019/004* (2013.01); *H04L 2012/40273* (2013.01)

(56) References Cited

U.S. PATENT DOCUMENTS

| | | | |
|---|---|---|---|
| 6,430,993 | B1 | 8/2002 | Seta |
| 6,532,812 | B2 | 3/2003 | King |
| 6,883,962 | B2 | 4/2005 | Kurata |
| 7,158,018 | B2 | 1/2007 | Schick |
| 7,299,694 | B2 | 11/2007 | Byrne |
| 7,404,318 | B2 | 7/2008 | Merino-Lopez et al. |
| 7,523,656 | B1 | 4/2009 | Blixhavn et al. |
| 7,543,491 | B2 | 6/2009 | Hammerschmidt et al. |
| 7,568,384 | B2 | 8/2009 | Morinaga |
| 7,577,532 | B2 | 8/2009 | Ichikawa et al. |
| 7,673,505 | B2 | 3/2010 | Hammerschmidt |
| 7,680,610 | B2 | 3/2010 | Miyashita et al. |
| 7,755,367 | B2 | 7/2010 | Schoen et al. |
| 8,049,515 | B2 | 11/2011 | Schoen et al. |
| 8,065,911 | B2 | 11/2011 | Taylor et al. |
| 8,096,172 | B2 | 1/2012 | Gotschlich |
| 8,371,159 | B2 | 2/2013 | Morinaga |
| 8,402,821 | B2 | 3/2013 | Fink et al. |
| 8,443,660 | B2 | 5/2013 | Grande et al. |
| 8,483,976 | B2 | 7/2013 | Morinaga |
| 8,555,698 | B2 | 10/2013 | Neugebauer et al. |
| 8,558,680 | B2 | 10/2013 | Pannek |
| 8,775,017 | B2 | 7/2014 | Brusarosco et al. |
| 8,794,058 | B2 | 8/2014 | Bigot et al. |
| 8,833,410 | B2 | 9/2014 | Paturle |
| 8,849,500 | B2 | 9/2014 | Gokyu et al. |
| 8,881,573 | B2 | 11/2014 | Paturle et al. |
| 8,892,298 | B2 | 11/2014 | Paturle et al. |
| 8,904,869 | B2 | 12/2014 | Paturle |
| 8,983,749 | B1 | 3/2015 | Singh |
| 9,052,257 | B2 | 6/2015 | Shibata |
| 9,259,976 | B2 | 2/2016 | Singh et al. |
| 9,423,320 | B2 | 8/2016 | Kuramoto et al. |
| 9,513,192 | B2 | 12/2016 | Kretschmann et al. |
| 9,669,664 | B2 | 6/2017 | Kretschmann |
| 9,873,293 | B2 | 1/2018 | Singh et al. |
| 9,908,374 | B2 | 3/2018 | Dussinger et al. |
| 9,921,134 | B2 | 3/2018 | Unterreiner et al. |
| 9,962,999 | B2 | 5/2018 | Roty |
| 9,963,146 | B2 | 5/2018 | Singh et al. |
| 9,994,082 | B2 | 6/2018 | Seboe et al. |
| 10,000,100 | B2 | 6/2018 | Weston |
| 10,005,328 | B2 | 6/2018 | Makino et al. |
| 10,024,765 | B2 | 7/2018 | Neau |
| 10,082,381 | B2 | 9/2018 | McMillen |
| 10,112,444 | B2 | 10/2018 | Takahashi et al. |
| 10,132,719 | B2 | 11/2018 | Fudulea |
| 10,150,339 | B2 | 12/2018 | Zaroor et al. |
| 10,207,551 | B2 | 2/2019 | Benbouhout et al. |
| 10,222,299 | B2 | 3/2019 | Ledoux |
| 10,245,906 | B2 | 4/2019 | Singh et al. |
| 10,252,583 | B2 | 4/2019 | Kandler et al. |
| 10,259,274 | B2 | 4/2019 | Lange et al. |
| 10,286,734 | B2 | 5/2019 | Masago |
| 10,286,735 | B2 | 5/2019 | Guinart et al. |
| 10,328,755 | B2 | 6/2019 | Tebano et al. |
| 10,350,949 | B2 | 7/2019 | Surendra |
| 10,399,396 | B2 | 9/2019 | Limbrunner et al. |
| 10,471,779 | B2 | 11/2019 | Masago |
| 10,495,457 | B2 | 12/2019 | Cyllik et al. |
| 10,513,156 | B2 | 12/2019 | Hrabal |
| 10,603,962 | B2 | 3/2020 | Singh |
| 10,753,828 | B2 | 8/2020 | Tamura et al. |
| 2003/0009270 | A1 | 1/2003 | Breed |
| 2012/0273102 | A1 | 11/2012 | Paturle |
| 2014/0005956 | A1 | 1/2014 | Patel et al. |
| 2014/0257629 | A1 | 9/2014 | Singh et al. |
| 2015/0034222 | A1* | 2/2015 | Martin ............... B60C 7/00 73/146 |
| 2017/0124784 | A1 | 5/2017 | Wittman et al. |
| 2017/0355234 | A1 | 12/2017 | Dharamshi et al. |
| 2018/0003593 | A1 | 1/2018 | Siegel et al. |
| 2018/0066929 | A1 | 3/2018 | Kandler et al. |
| 2018/0180463 | A1 | 6/2018 | Cyllik et al. |
| 2018/0253109 | A1 | 9/2018 | Fontaine et al. |
| 2018/0268532 | A1 | 9/2018 | Wang et al. |
| 2019/0025113 | A1 | 1/2019 | Masago |
| 2019/0180505 | A1* | 6/2019 | Zoken ............... G01B 11/24 |
| 2019/0184763 | A1 | 6/2019 | Pulford et al. |
| 2019/0193479 | A1 | 6/2019 | Pulford et al. |
| 2019/0265129 | A1 | 8/2019 | Tamura et al. |
| 2019/0304084 | A1 | 10/2019 | Oblizajek |
| 2019/0382034 | A1 | 12/2019 | Miller et al. |
| 2020/0001662 | A1 | 1/2020 | Storti et al. |
| 2020/0023693 | A1 | 1/2020 | Ochi et al. |
| 2020/0031183 | A1 | 1/2020 | Kim |
| 2020/0047571 | A1 | 2/2020 | Oblizajek |
| 2020/0062268 | A1 | 2/2020 | Steiner |
| 2020/0070589 | A1 | 3/2020 | Kuerzl et al. |
| 2020/0094634 | A1 | 3/2020 | Decoster et al. |
| 2020/0126323 | A1 | 4/2020 | Ledoux et al. |
| 2020/0231010 | A1* | 7/2020 | Carpenter ............ B60C 11/246 |
| 2021/0101414 | A1* | 4/2021 | Zoken .................. G06T 7/0006 |

FOREIGN PATENT DOCUMENTS

| | | |
|---|---|---|
| WO | 2019239305 A3 | 2/2020 |
| WO | 2020070051 A1 | 4/2020 |

OTHER PUBLICATIONS

Office Action in corresponding Chinese application received by Applicant dated Mar. 25, 2022.
Office Action issued to Applicant dated Nov. 2, 20228 in corresponding Chinese application.
EPO search report received by Applicant dated Dec. 20, 2020.

* cited by examiner

METHOD FOR EXTRACTING CHANGES IN TIRE CHARACTERISTICS

FIELD OF THE INVENTION

The invention relates generally to tire monitoring. More particularly, the invention relates to systems and methods that sense specific tire characteristics to predict or estimate certain conditions of the tire. Specifically, the invention is directed to a method for extracting changes in tire characteristics over the life of the tire to improve the accuracy of systems that estimate tire conditions.

BACKGROUND OF THE INVENTION

Tire estimation systems and methods are known in the art. Such systems and methods estimate tire conditions such as the tire wear state and/or the tire load. To perform the estimation, these systems and methods take specific tire characteristics into account, such as the tire inflation pressure, tire temperature, tread depth, road conditions, and the like.

In the prior art, direct measurement techniques were employed. Direct measurement techniques involve the use of sensors to try and directly measure characteristics such as tire inflation pressure, tire temperature, tread depth and road conditions. For example, a pressure transducer disposed in the tire measures tire pressure, a thermocouple disposed in the tire measures tire temperature, a wear sensor disposed in the tire tread measures tread depth, and a vibration sensor or an accelerometer measures road conditions. Data gathered by such sensors has been transmitted to a processor with a memory to enable the data to be collected. The collected data may then be sent to a display unit to show the measured tire characteristics, and/or sent to electronic storage for analysis and/or review.

Such direct measurement techniques may not enable prediction of tire conditions such as the wear state or load in an accurate, reliable or economical manner. In order to overcome such disadvantages, indirect estimation techniques have been developed.

Indirect techniques involve inputting measured tire characteristics such as tire inflation pressure, tire temperature, tread depth and road conditions from sensor data into a statistical model that is stored on a processor. The model performs an analysis of the data to estimate or predict tire conditions, such as the tire wear state and the tire load.

While indirect estimation techniques have been successful at estimating or predicting tire conditions, they do not take into account bias or variance in certain tire characteristics that change over the life of the tire. By not accounting for such characteristics, the accuracy of prior art indirect estimation techniques is undesirably reduced.

As a result, there is a need in the art for a method that improves the accuracy of indirect estimation systems, which estimate tire conditions, by accounting for and extracting changes in tire characteristics over the life of the tire.

SUMMARY OF THE INVENTION

According to an aspect of an exemplary embodiment of the invention, a method for extracting changes in characteristics of a tire supporting a vehicle is provided. The method includes the steps of extracting selected tire characteristics from at least one sensor mounted on the tire and transmitting the selected tire characteristics to a remote processor. The selected tire characteristics are stored in a historical data log that is in communication with the remote processor. At least one tire characteristic of interest is selected. A time series decomposition model is applied to data from the historical data log to delineate exogenous inputs from an underlying trend in the selected tire characteristic of interest. A learning model is applied to the underlying trend in the selected tire characteristic of interest to model a relationship between the selected tire characteristic of interest and a condition of the tire. A prediction value for a condition of the tire is output from the learning model.

BRIEF DESCRIPTION OF THE DRAWINGS

The invention will be described by way of example and with reference to the accompanying drawings, in which.

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

With reference to FIGS. 1 through 6, an exemplary embodiment of a method for extracting changes in tire characteristics of the present invention is indicated at 100. To illustrate an exemplary environment in which the method 100 of the invention is employed, a tire wear state estimation system is indicated at 10 and will now be described. The tire wear state estimation system 10 is described in greater detail in an Application titled "Tire Wear State Estimation System and Method Employing Footprint Length", which is being filed concurrently with the instant Application by the same Assignee, The Goodyear Tire & Rubber Company, and which is incorporated herein in its entirety.

Figure 1:
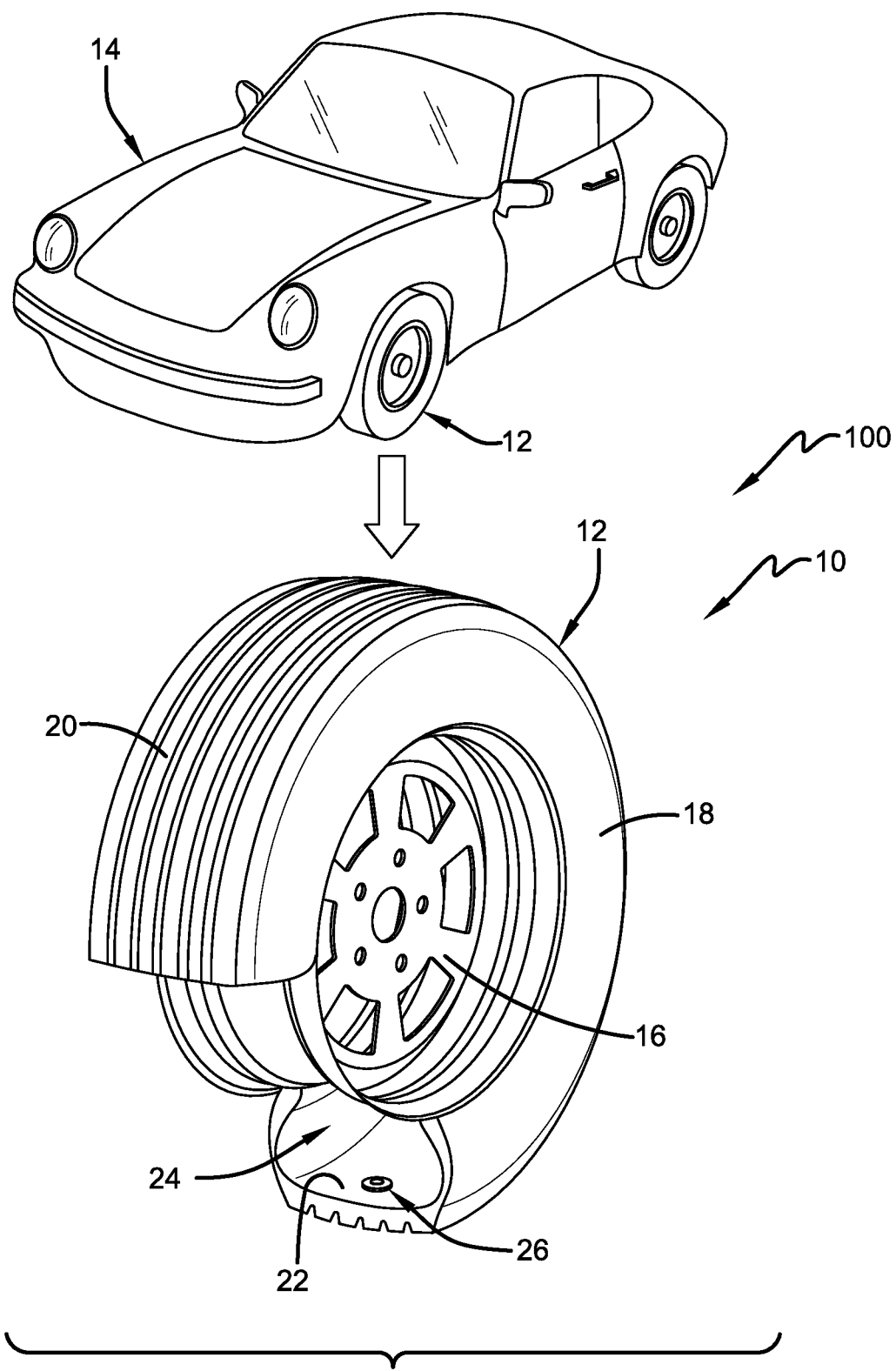
FIG. 1 is a schematic perspective view of a vehicle that includes a tire with a tire wear state estimation system that employs an exemplary embodiment of a method for extracting changes in tire characteristics of the present invention.

With particular reference to FIG. 1, the tire wear state system 10 estimates the tread wear on each tire 12 supporting a vehicle 14. It is to be understood that the vehicle 14 may be any vehicle type, and is shown by way of example as a passenger car. The tires 12 are of conventional construction, and each tire is mounted on a respective wheel 16 as known to those skilled in the art. Each tire 12 includes a pair of sidewalls 18 (only one shown) that extend to a circumferential tread 20, which wears with age from road abrasion. An innerliner 22 is disposed on the inner surface of the tire 12, and when the tire is mounted on the wheel 16, an internal cavity 24 is formed, which is filled with a pressurized fluid, such as air.

A sensor unit 26 is attached to the innerliner 22 of each tire 12 by means such as an adhesive, and measures certain characteristics of the tire, such as tire pressure 38 (FIG. 2) and temperature 40. For this reason, the sensor unit 26 preferably includes a pressure sensor and a temperature sensor, and may be of any known configuration. The sensor unit 26 preferably also includes electronic memory capacity for storing identification (ID) information for each tire 12, known as tire ID information and indicated at 42. The sensor unit 26 preferably also measures a length 28 of a centerline of a footprint of the tire 12.

Figure 2:
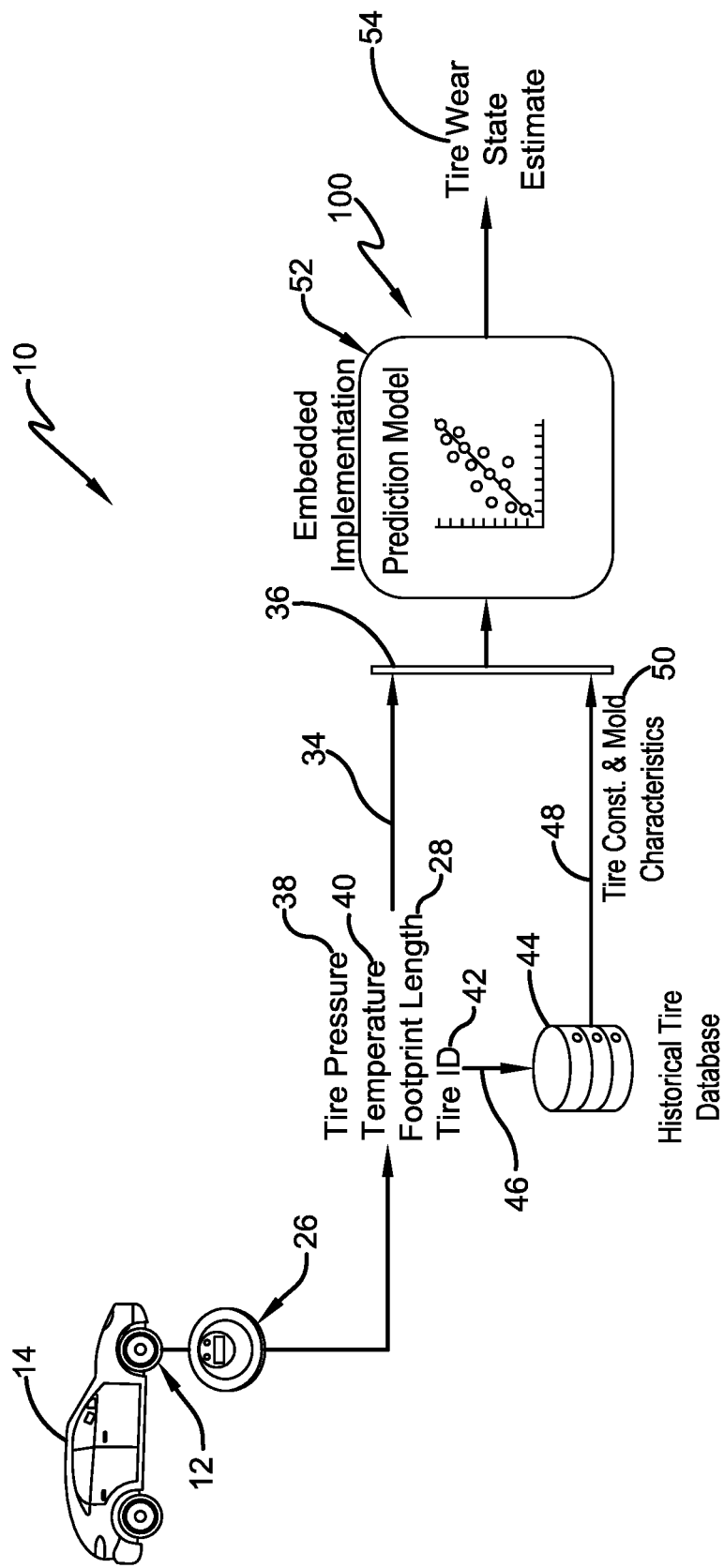
FIG. 2 is a schematic diagram of the tire wear state estimation system that employs an exemplary embodiment of a method for extracting changes in tire characteristics of the present invention.

Turning to FIG. 2, the sensor unit 26 includes transmission means 34 for sending the measured characteristics of tire pressure 38, tire temperature 40 and centerline length 28, as well as tire ID information 42, to a processor 36. The transmission means 34 may include an antenna for wireless transmission or wires for wired transmission. The processor 36 may be integrated into the sensor unit 26, or may be a remote processor, which may be mounted on the vehicle 14 or be cloud-based. The tire ID information 42 enables a tire construction database 44 to be electronically accessed 46. The tire construction database 44 stores tire construction data 50, and is in electronic communication with the processor 36, enabling transmission 48 of the tire construction data to the processor.

Figure 3:
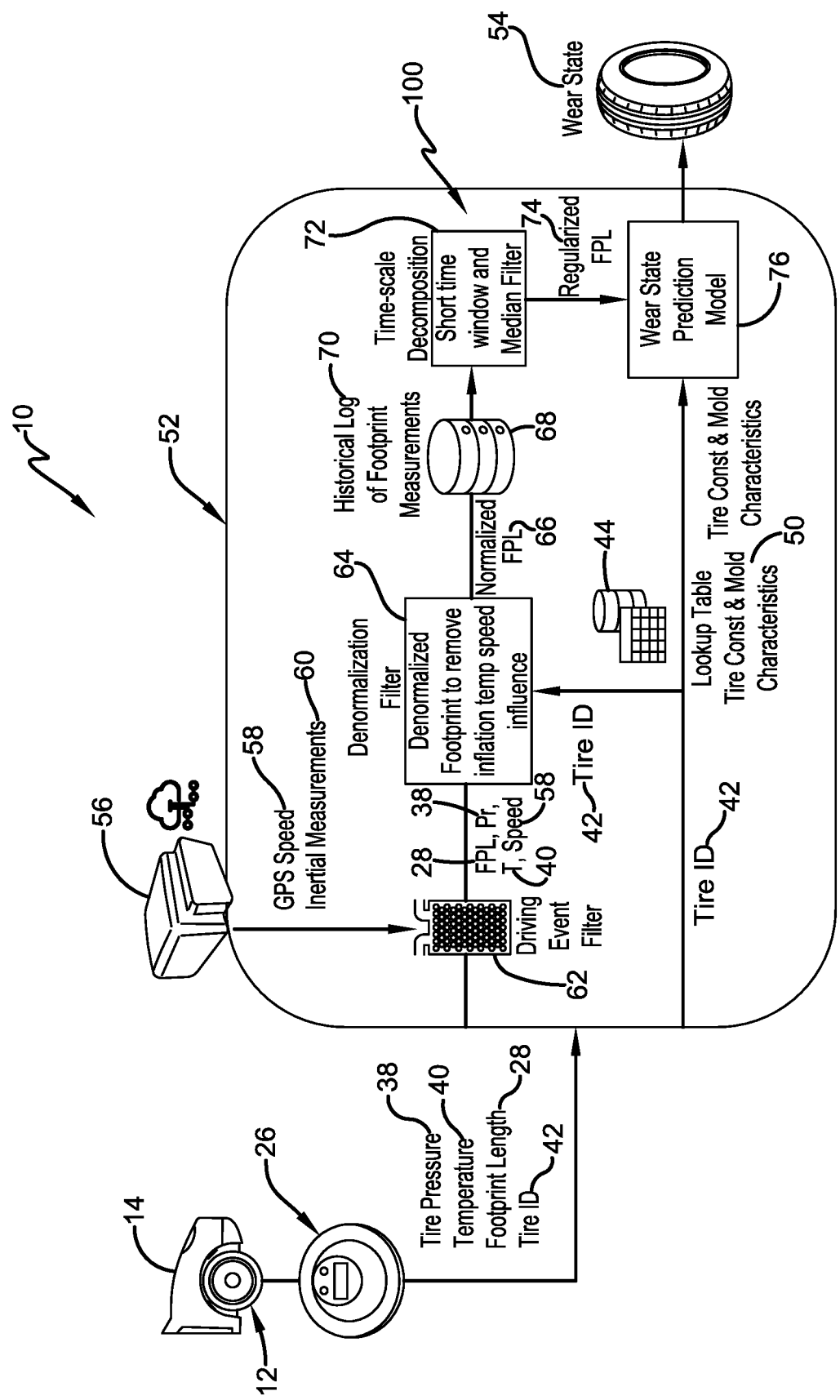
FIG. 3 is a schematic diagram showing aspects of an analysis module of the tire wear state estimation system shown in FIG. 2.

An analysis module 52 is stored on the processor 36, and receives the tire pressure 38, tire temperature 40, tire centerline length 28, tire ID information 42, and tire construction data 50. The analysis module 52 analyzes these inputs to generate an estimate of the tire wear state, indicated at 54. Referring to FIG. 3, the analysis module 52 preferably also receives data from a vehicle-mounted collection unit 56, including vehicle speed 58 as calculated from global positioning system (GPS) data, and inertial measurements 60 for the vehicle 14 from an accelerometer.

An event filter 62 is applied to the data received from the vehicle-mounted collection unit 56. More particularly, vehicle conditions are reviewed in the event filter 62, including the measured vehicle speed 58 from GPS data and the inertial measurements 60. These measured values are compared to threshold values, including upper and lower limits. If the measured values are outside of the threshold values, the system 10 does not proceed, as the vehicle 14 is likely to be operating outside of normal or predictable conditions. If the measured values are within the threshold values, the measured data of tire pressure 38, tire temperature 40, centerline length 28 and vehicle speed 58 are sent to a denormalization filter 64.

The denormalization filter 64 is employed to account for and eliminate the effect of inflation pressure 38, temperature 40 and vehicle speed 58 on the centerline length 28 of the tire 12. In the denormalization filter 64, a pre-trained regression model is used to account for the effects of inflation pressure 38, temperature 40 and vehicle speed 58. Regardless of the vehicle and tire operating conditions, the centerline length 28 is regressed to a pre-defined nominal condition, that is, a pre-defined inflation pressure 38, temperature 40 and vehicle speed 58.

In addition, the fastest wearing portion of the tire 12 may not always be at the centerline. For many tires, the fastest wear may be at a shoulder. However, the difference between the wear rate of the tire 12 at the centerline and at the shoulder typically is dependent upon the tire construction data 50, including the tire footprint shape factor (FSF), mold design drop, tire belt/breaker angle and/or the overlay material. The tire construction data 50 from the tire construction database 44 thus is input into the denormalization filter 64, and is used in conjunction with the centerline length measurement 28 from the sensor unit 26 to estimate a length at the shoulder, which may be the fastest-wearing portion of the tread 20.

The denormalization filter 64 generates a normalized footprint length 66. Because the centerline length 28 of the tire 12 may also be affected by the vehicle load, the effect of load on the normalized footprint length 66 must be accounted for and eliminated. To eliminate the effect of load on the normalized footprint length 66, a historical footprint measurement database 68 is accessed. The historical footprint measurement database 68 is in electronic communication with the processor 36 and may be stored on the processor, and contains a historical log of footprint measurements 70. The normalized footprint length 66 is correlated to the historical log 70 and an average of the values is taken.

The average of the values is applied to a time filter 72. The time filter 72 is a module that applies the steps of the method for extracting changes in tire characteristics 100, which will be described in greater detail below. The time filter 72 yields a regularized footprint length 74 for the tire 12. The regularized footprint length 74 is input into a prediction model 76, which applies a non-linear regression model to generate the estimated wear state 54 for the tire 12.

Figure 4:
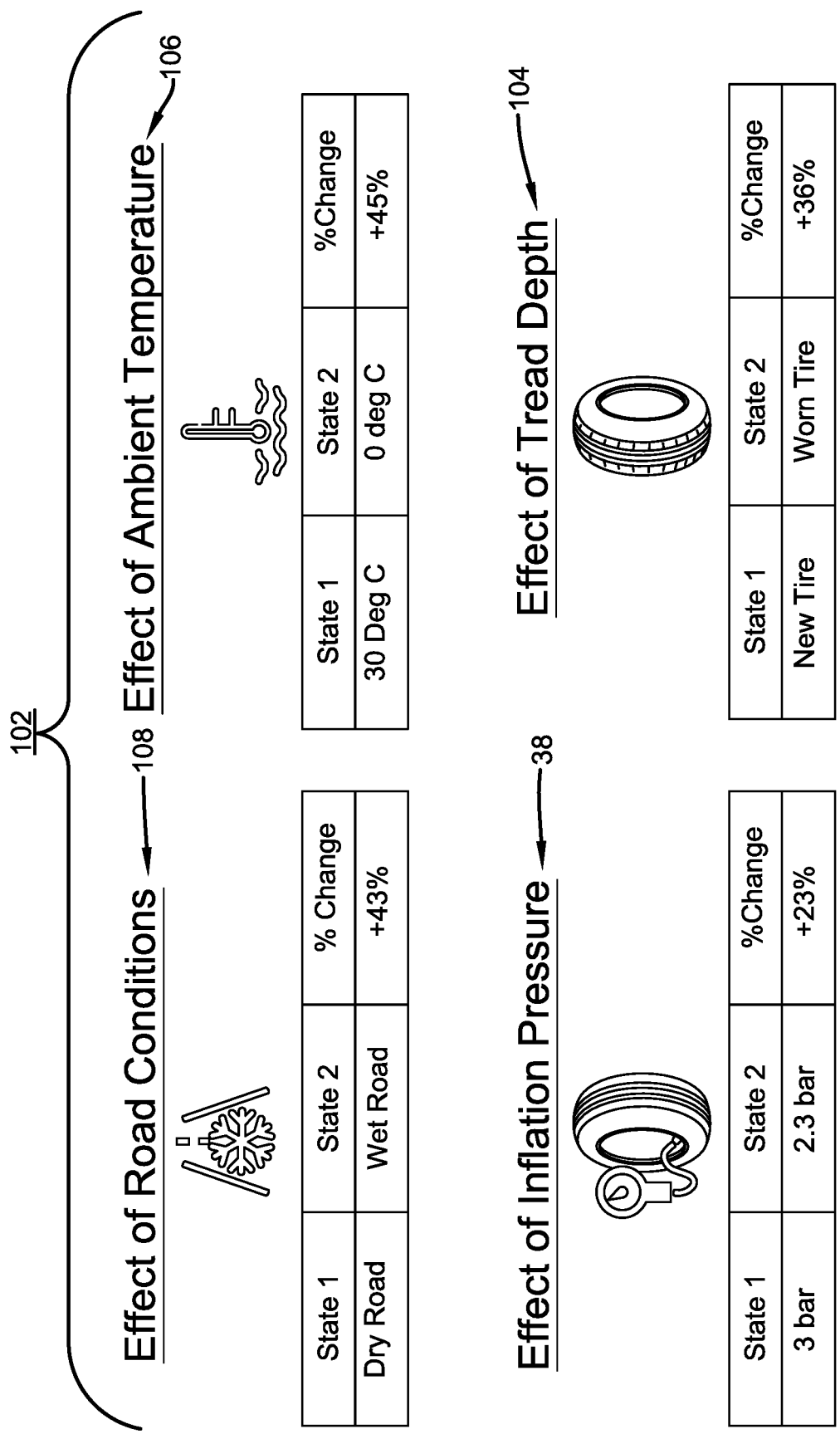
FIG. 4 is a tabular representation of characteristics changing over the life of a tire.
Figure 5:
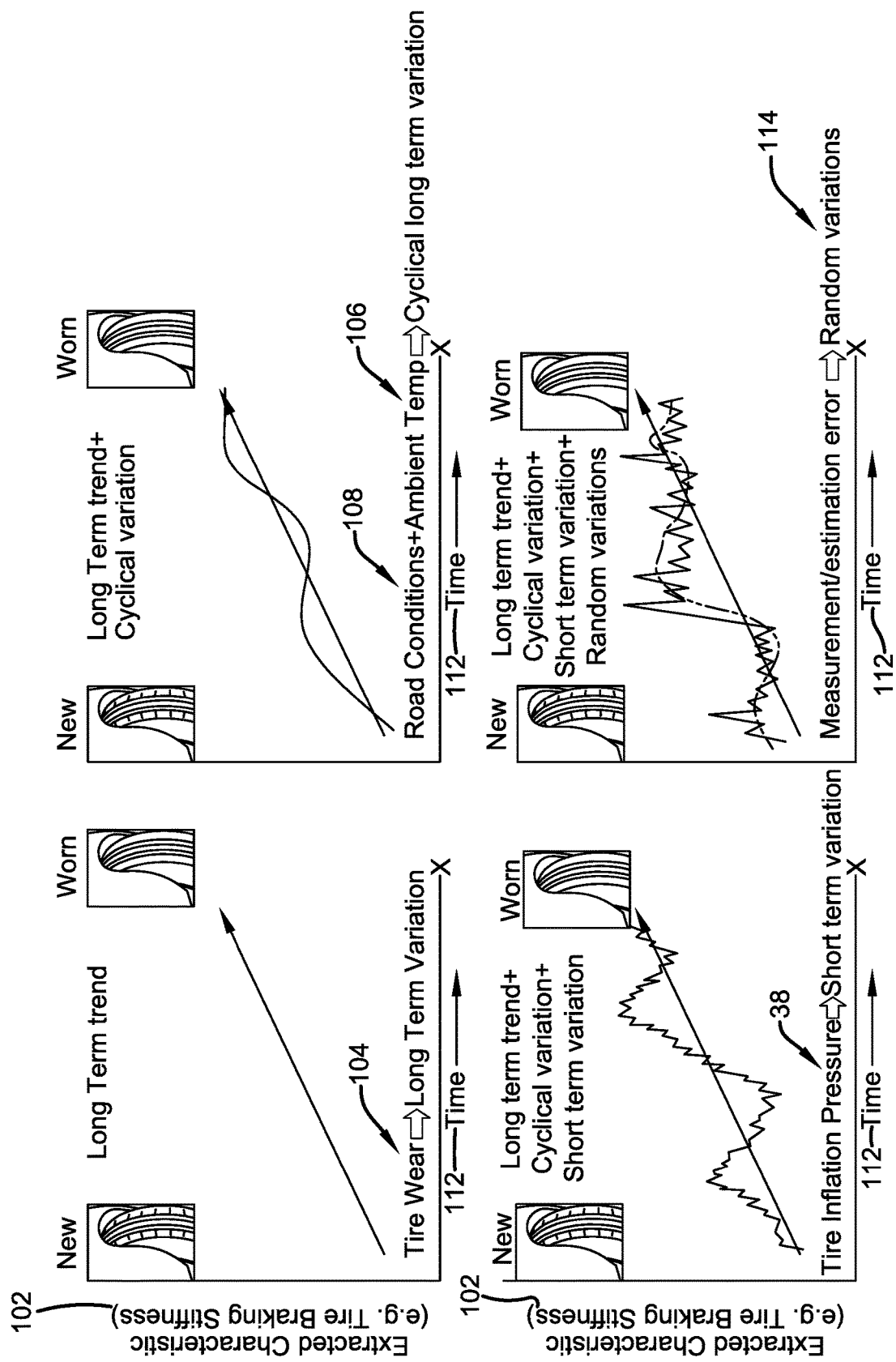
FIG. 5 is a graphical representation of characteristics changing over the life of a tire.
Figure 6:
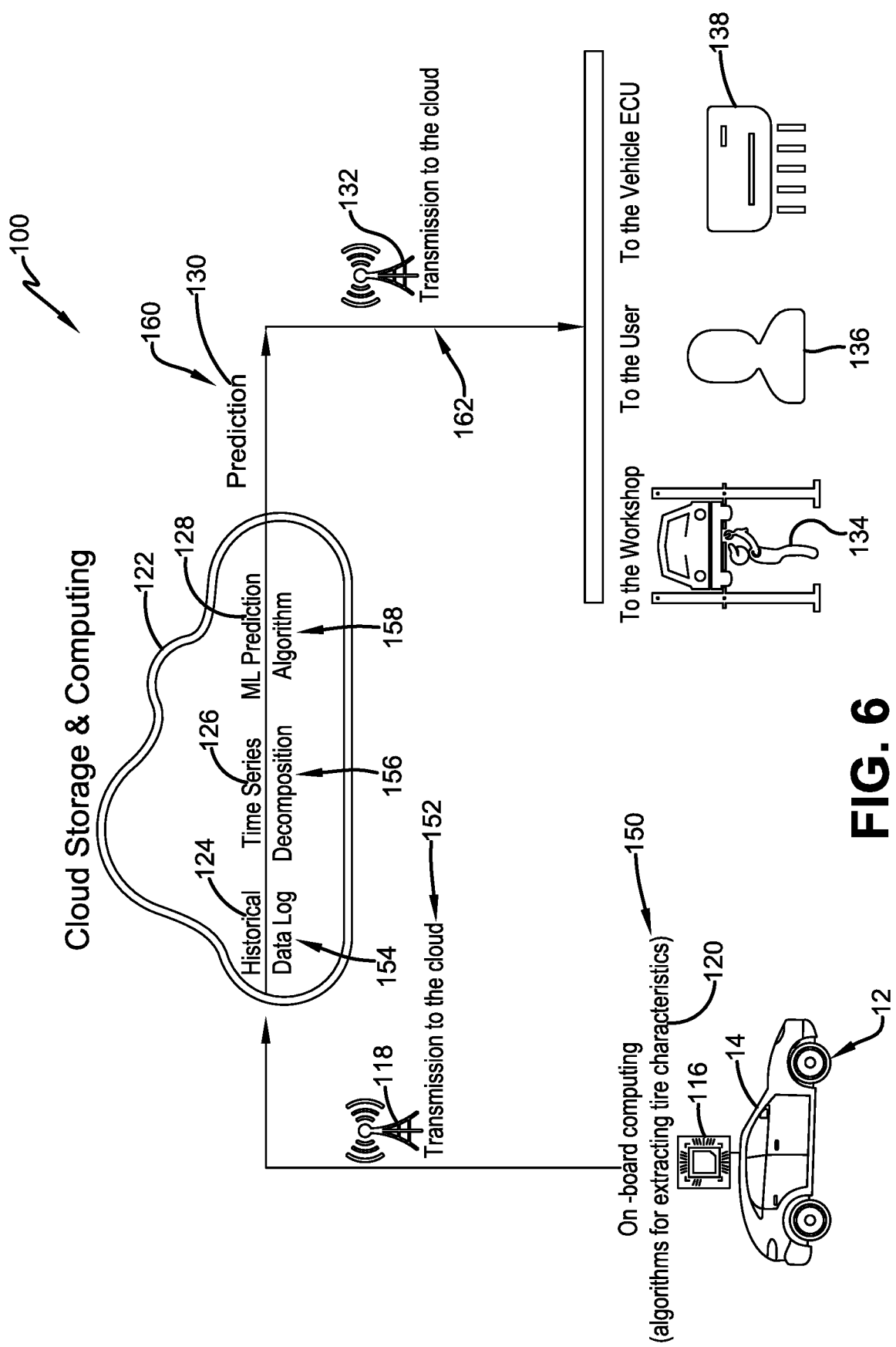
FIG. 6 is a schematic diagram showing exemplary steps of the method for extracting changes in tire characteristics of the present invention.

With reference to FIGS. 4 through 6, the method for extracting changes in tire characteristics 100 improves the accuracy of indirect estimation systems, such as the wear estimation system 10, by accounting for and extracting changes in tire characteristics over the life of the tire 12. Tire characteristics such as tire inflation pressure 38, tire temperature 40, tread depth and road conditions change over the life of the tire 12. These characteristics are affected by more than one factor.

For example, as shown in FIG. 4, testing established that a braking stiffness 102 of the tire 12, which is a measure of tire stiffness, changes with tire wear or tread depth, indicated at 104. The braking stiffness 102 of the tire 12 also changes with other operating conditions such as ambient temperature 106, road surface conditions 108 and the inflation pressure 38. FIG. 5 shows how changes in each of these characteristics over time 112 affects braking stiffness 102. In addition to tire wear or tread depth 104, ambient temperature 106, road surface conditions 108 and inflation pressure 38 affecting the braking stiffness 102 of the tire 12, random variations 114 over time 112 may affect the braking stiffness.

Such changes of the characteristics of the tire 12 over time 112 make prediction models susceptible to bias and/or variance. The method for extracting changes in tire characteristics 100 models such variations in the tire characteristics after time scales by using an additive time series. As described above, tire characteristics include tire inflation pressure 38, tire temperature 40, ambient temperature 106, tread depth 104, road surface conditions 108, and the like. For the purpose of convenience, reference will be made to tire characteristics 120 with the understanding that such reference includes these characteristics.

With particular reference to FIG. 6, the method 100 includes step 150, which is extraction of relevant tire characteristics from sensors on the tire 12 and/or the vehicle 14. For example, a processor 116 may be mounted on the vehicle 14 or the tire 12, which receives certain tire characteristics 120, such as inflation pressure 38 and tire temperature 40 from the sensor unit 26 (FIG. 1). The processor 116 may also receive characteristics 120 such as ambient temperature 106 and road surface conditions 108 from tire-mounted sensors, vehicle-mounted sensors, and/or the vehicle CAN bus. To perform the extraction, the processor 116 executes a data analysis tool, which retrieves selected characteristics 120 from the sensor(s) and/or the CAN bus.

The processor 116 includes or is in electronic communication with an antenna 118, which provides transmission of the selected characteristics 120 to a remote processor, such as a processor in a cloud-based server 122, step 152. The cloud-based server 122 includes or is otherwise in communication with a historical data log 124 of the extracted tire characteristics 120. Storage of the characteristics 120 in the historical data log 124 is provided at step 154. Step 154 optionally includes augmenting the historical data log 124 with contextual information such as weather, road roughness, and road topology data.

Next, in step 156, one or more tire characteristic(s) of interest 120 are selected, and a time series decomposition model 126 is applied to the data from the historical data log 124. The time series decomposition model 126 delineates or separates exogenous inputs or data from an underlying trend in the selected tire characteristic(s) of interest 120.

A learning model 128 is then applied to the underlying trend in the selected tire characteristic(s) of interest 120, step 158. The learning model 128 may be a machine learning model, a deep learning model, or a statistical model, and models the relationship between the tire characteristic(s) of interest 120 and the condition of the tire 12 to be predicted, such as tire wear state or tire load. The learning model 128 outputs a prediction value 130 at step 160. The prediction value 130 is a value that has been filtered to eliminate bias due to factors that affect the tire 12 over time, and thus is a value with improved accuracy.

In the example of the wear state estimation system 10 shown in FIGS. 4 and 5, the time filter 72 executes steps 154 and 156, outputting the regularized footprint length 74. The regularized footprint length 74 is input into a prediction model 76 to execute steps 158 and 160 to generate a prediction value 130, which is the estimated wear state 54 for the tire 12.

Returning to FIG. 6, the prediction value 130 may be transmitted in step 162 by an antenna 132 to one or more destinations, depending on how the method for extracting changes in tire characteristics 100 is employed. For example, the prediction value 130 may be transmitted to a service center or a fleet manager 134. Additionally, or as an alternative, the prediction value 130 may be transmitted to a display device that is accessible to a user 136 of the vehicle 14, such as a smartphone. Also, or as another alternative, the prediction value 130 may be transmitted to an electronic control unit 138 of the vehicle 14 and/or a vehicle control system, such as the braking system and/or the suspension system, to increase the performance of such systems.

In this manner, the method for extracting changes in tire characteristics 100 improves the accuracy of indirect estimation systems by accounting for and extracting changes in tire characteristics over the life of the tire 12.

It is to be understood that the steps and accompanying structure of the above-described method for extracting changes in tire characteristics 100 may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications. In addition, tire characteristics and tire conditions other than those described above and known to those skilled in the art may be employed, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A method for extracting changes in characteristics of a tire supporting a vehicle, the method comprising the steps of:

extracting selected tire characteristics from at least one sensor mounted on the tire;

transmitting the selected tire characteristics to a remote processor;

storing the selected tire characteristics in a historical data log in communication with the remote processor;

selecting at least one tire characteristic of interest;

applying a time series decomposition model to data from the historical data log to delineate exogenous inputs from an underlying trend in the selected tire characteristic of interest;

applying a learning model to the underlying trend in the selected tire characteristic of interest to model a relationship between the selected tire characteristic of interest and a condition of the tire; and outputting from the learning model a prediction value for a condition of the tire.

2. The method for extracting changes in characteristics of a tire supporting a vehicle of claim 1, wherein the step of extracting tire characteristics from at least one sensor mounted on the tire includes the steps of:
- mounting a processor on at least one of the vehicle and the tire;
- receiving tire characteristics from a sensor unit mounted on the tire in the processor that is mounted on at least one of the vehicle and the tire; and
- executing on the processor that is mounted on at least one of the vehicle and the tire a data analysis tool to retrieve the selected characteristics.

3. The method for extracting changes in characteristics of a tire supporting a vehicle of claim 1, further comprising the step of extracting selected tire characteristics from sensors mounted on the vehicle.

4. The method for extracting changes in characteristics of a tire supporting a vehicle of claim 1, further comprising the step of extracting selected tire characteristics from a vehicle CAN bus.

5. The method for extracting changes in characteristics of a tire supporting a vehicle of claim 1, further comprising the step of augmenting the historical data log with contextual information including at least one of weather, road roughness, and road topology data.

6. The method for extracting changes in characteristics of a tire supporting a vehicle of claim 1, wherein the deep learning model includes at least one of a machine learning model, a deep learning model, and a statistical model.

7. The method for extracting changes in characteristics of a tire supporting a vehicle of claim 1, wherein the condition of the tire includes at least one of a wear state of the tire and a load of the tire.

8. The method for extracting changes in characteristics of a tire supporting a vehicle of claim 1, further comprising the step of transmitting the prediction value to at least one of a service center and a fleet manager.

9. The method for extracting changes in characteristics of a tire supporting a vehicle of claim 1, further comprising the step of transmitting the prediction value to a display device that is accessible to a user of the vehicle.

10. The method for extracting changes in characteristics of a tire supporting a vehicle of claim 1, further comprising the step of transmitting the prediction value to at least one of an electronic control unit of the vehicle and a vehicle control system.

* * * * *